(12) United States Patent
Shirvani-Mahdavi

(10) Patent No.: US 8,755,463 B2
(45) Date of Patent: Jun. 17, 2014

(54) RECEIVING AND TRANSMITTING SIGNALS ACROSS NON-CONTIGUOUS CHANNELS IN A COMMUNICATION SYSTEM

(75) Inventor: Alireza Shirvani-Mahdavi, San Jose, CA (US)

(73) Assignee: Mediatek Singapore Ptd. Ltd., Singapore (SG)

( * ) Notice: Subject to any disclaimer, the term of this patent is extended or adjusted under 35 U.S.C. 154(b) by 183 days.

(21) Appl. No.: 13/277,925

(22) Filed: Oct. 20, 2011

(65) Prior Publication Data

US 2013/0101067 A1    Apr. 25, 2013

(51) Int. Cl.
 *H03K 9/00* (2006.01)
(52) U.S. Cl.
 USPC ........... 375/316; 375/340; 455/285; 455/255; 455/73
(58) Field of Classification Search
 USPC ............ 375/316, 314, 260, 340; 455/285, 73, 455/323, 455
 See application file for complete search history.

(56) References Cited

U.S. PATENT DOCUMENTS

| | | | |
|---|---|---|---|
| 8,107,916 B2* | 1/2012 | Gatta et al. | 455/285 |
| 2011/0096874 A1* | 4/2011 | Walsh et al. | 375/340 |
| 2013/0045704 A1* | 2/2013 | Kaukovuori et al. | 455/255 |
| 2013/0109325 A1* | 5/2013 | Afsahi et al. | 455/73 |
| 2013/0130638 A1* | 5/2013 | Kaukovuori et al. | 455/323 |
| 2013/0136211 A1* | 5/2013 | Jussila et al. | 375/340 |

* cited by examiner

*Primary Examiner* — Eva Puente
(74) *Attorney, Agent, or Firm* — Sawyer Law Group, P.C.

(57) ABSTRACT

Embodiments for processing signals are disclosed. In one embodiment, a method includes receiving signals from at least two non-contiguous channels, where the at least two non-contiguous channels are within a predetermined bandwidth, and where each of the at least two non-contiguous channels has a center frequency. The method also includes utilizing an average of the center frequencies of the at least two non-contiguous channels to down convert the at least two non-contiguous channels to a combined intermediate frequency (IF) channel that has a center frequency that is an average of a difference between the center frequencies of the at least two non-contiguous channels. The method also includes down converting the combined IF channel to a combined channel at a baseband frequency. The method also includes recovering the at least two non-contiguous channels from the combined channel at a baseband frequency utilizing an upper sideband and lower sideband recovery mechanism.

20 Claims, 6 Drawing Sheets

RECEIVING AND TRANSMITTING SIGNALS ACROSS NON-CONTIGUOUS CHANNELS IN A COMMUNICATION SYSTEM

FIELD OF THE INVENTION

The present invention relates generally to wireless communication systems, and more particularly to the transmission and reception of signal when provided over non-contiguous channels within a predetermined bandwidth.

BACKGROUND

It is known that some wireless standards allow for the transmission of data packets in segments that are in noncontiguous channels within a predetermined bandwidth. For example, the IEEE standard 802.11 ac allows for transmission of signals across non-contiguous channels within a given bandwidth. In such a system, a receiver must accommodate the entire transmission bandwidth, including the portion of the bandwidth between the non-contiguous channels. In a conventional receiver, two separate radio frequency (RF) paths are provided. The use of two receive paths is costly, consumes excess power, and requires a large footprint due to the second receive path.

Accordingly, what is desired is an improved method and system for transmitting information across non-contiguous channels. The system and method should be easily implemented, cost effective, and power efficient; should require a small footprint; and should be adaptable to existing communications systems. Embodiments described herein address such a need.

SUMMARY

A method and system for transmitting non contiguous channels in a communication system is disclosed. In one aspect, the method includes receiving signals from at least two non-contiguous channels, where the at least two non-contiguous channels are within a predetermined bandwidth, and where each of the at least two non-contiguous channels has a center frequency.

The method also includes utilizing an average of the center frequencies of the at least two non-contiguous channels to down convert the at least two non-contiguous channels to a combined intermediate frequency (IF) channel that has a center frequency that is an average of a difference between the center frequencies of the at least two non-contiguous channels. The method also includes down converting the combined IF channel to a combined channel at a baseband frequency. The method also includes recovering the at least two non-contiguous channels from the combined channel utilizing an upper sideband and lower sideband recovery mechanism.

In another embodiment, a system includes an amplifier for receiving signals from at least two non-contiguous channels, where the at least two non-contiguous channels are within a predetermined bandwidth, and where each of the at least two non-contiguous channels has a center frequency. The system also includes at least two down converters coupled to the amplifier. The at least two down converters utilize an average of the center frequencies of the at least two non-contiguous channels to down convert the at least two non-contiguous channels to a combined intermediate frequency (IF) channel that has a center frequency that is an average of a difference between the center frequencies of the at least two non-contiguous channels. The at least two down converters also down convert the combined IF channel to a combined channel at a baseband frequency. The system also includes a signal processor coupled to the at least two down converters, where the signal processor recovers the at least two non-contiguous channels from the combined channel at a baseband frequency utilizing an upper sideband and lower sideband recovery mechanism.

DETAILED DESCRIPTION

The present invention relates generally to wireless communication systems, and more particularly to radio frequency (RF) architecture. The following description is presented to enable one of ordinary skill in the art to make and use embodiments of the invention, and is provided in the context of a patent application and its requirements. Various modifications to the embodiments and the generic principles and features described herein will be readily apparent to those skilled in the art. Thus, embodiments of the present invention are not intended to be limited to the examples shown, but are to be accorded the widest scope consistent with the principles and features described herein.

Embodiments enable the use of a radio receiver with a single receive path to receive signals from non-contiguous channels within a predetermined bandwidth. In one embodiment, for example, an amplifier of a receiver receives signals from two non-contiguous channels within a predetermined bandwidth. In one embodiment, each channel may be of equal bandwidth and each channel has a center frequency. The channels are then down converted utilizing an average of the center frequencies of the at least two channels to convert the at least two channels to a combined channel that has a center frequency that is the average of the difference between the two center frequencies. Thereafter, the at least two channels can be recovered utilizing upper sideband and lower sideband recovery mechanisms.

Embodiments described herein may be implemented in a variety of communication systems, including wireless networking environments. For example, embodiments may be implemented in wireless local area network (WLAN) communications systems, and may operate in accordance with various communication standards (e.g., IEEE 802.11 ac, TV white space technology, etc.).

Figure 1:
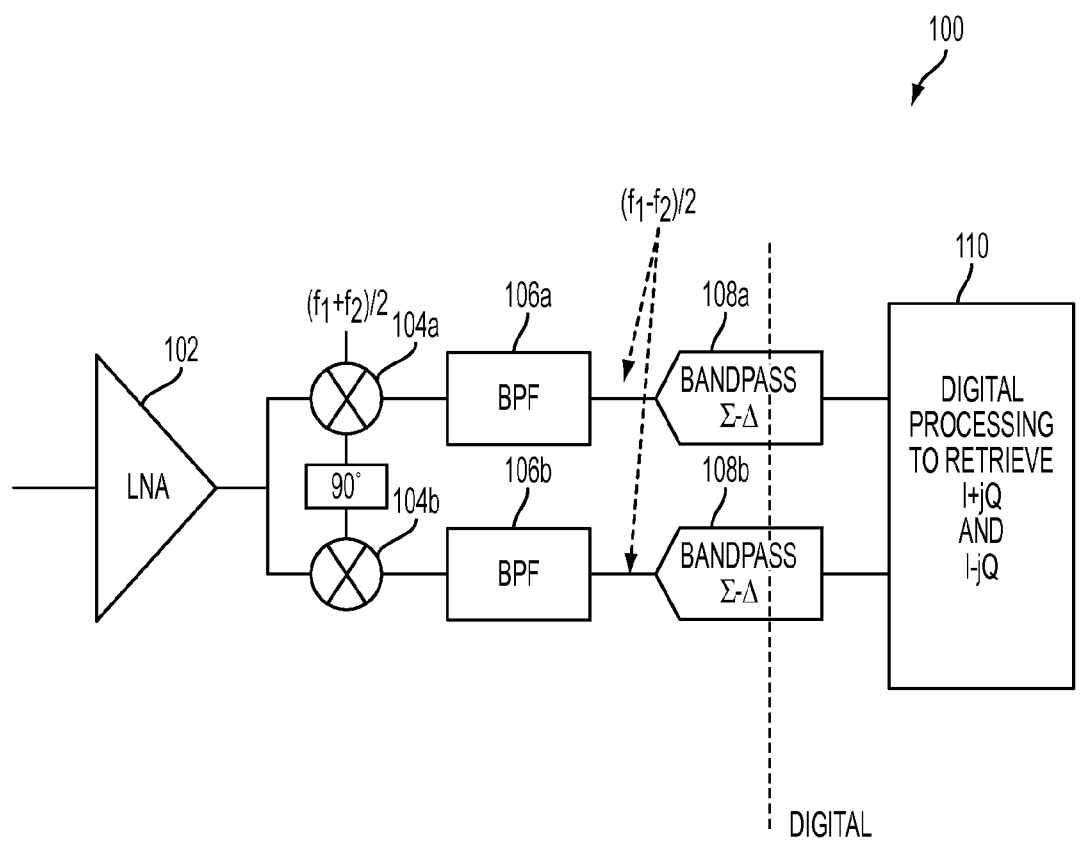
FIG. 1 is a block diagram of a first embodiment of a receiver circuit in accordance with the present invention.

FIG. 1 is a block diagram of a first embodiment of a receiver circuit in accordance with the present invention. The receiver circuit includes a low-noise amplifier (LNA) 102, which is coupled to first and second mixers 104a and 104b. The first and second mixers 104a and 104b provide signals that are shifted by 90 degrees from each other. The mixer 104a is coupled to a band-pass filter (BPF) 106a. The BPF 106a is coupled to a band-pass analog-to-digital converter (ADC) 108a. The band-pass ADC 108a is coupled to a digital signal processor 110. Similarly, the mixer 104b is coupled to a BPF 106b. The BPF 106b is coupled to a band-pass ADC 108b. The band-pass ADC 108b is coupled to the digital signal processor 110. In one embodiment, the band-pass ADCs 108a and 108b may be bandpass delta-sigma (Σ-Δ) ADCs. The operation of receiver circuit 100 is described in detail below.

The receiver circuit 100 has several advantages over conventional solutions. First it only requires one RF receive path rather than requiring two separate RF receive paths. Because the receiver circuit 100 has a single receive path, it is less costly, takes up less space, and is more power-efficient than solutions requiring a separate RF receive path for each channel.

To describe the features of the present invention in more detail refer now to the following description in conjunction with the accompanying figures.

Figure 2:
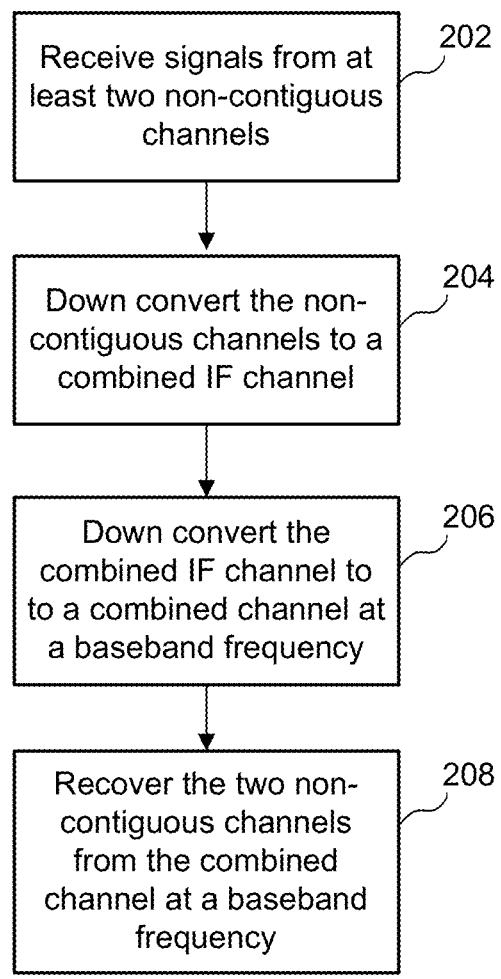
FIG. 2 is a flow chart which illustrates receiving data from non-contiguous channels within a predetermined bandwidth.

FIG. 2 is a flow chart which illustrates receiving data from non-contiguous channels within a predetermined bandwidth. Referring to both FIGS. 1 and 2 together, first, the low-noise amplifier 102 receives signals from at least two non-contiguous channels, via step 202. The two non-contiguous channels are within a predetermined bandwidth, and each of the non-contiguous channels has a center frequency.

Figure 3:
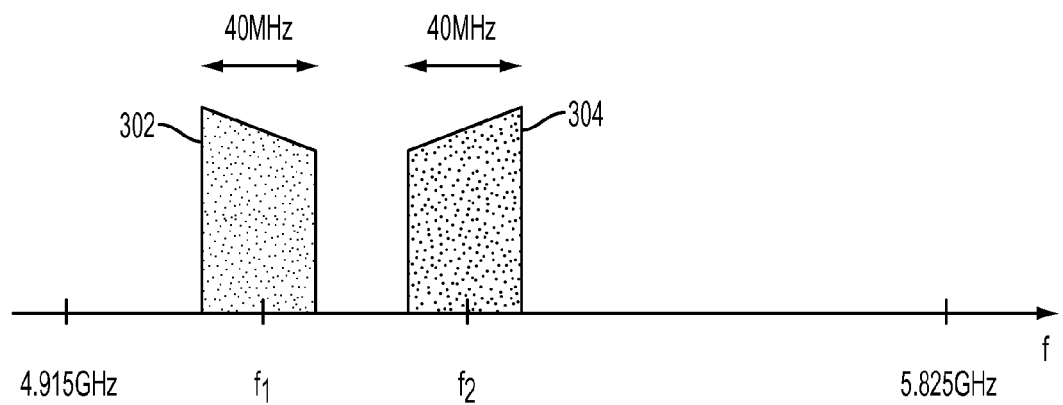
FIG. 3 is a diagram that illustrates two non-contiguous channels within a predetermined bandwidth.

FIG. 3 is a diagram that illustrates two non-contiguous channels within a predetermined bandwidth. As FIG. 3 shows, the non-contiguous channels 302 and 304 each have a bandwidth of 40 MHz, where frequency channel 302 has a center frequency $f_1$, and the frequency channel 304 has a center frequency $f_2$, where, in this example, $f_2$ is greater than $f_1$. The channels 302 and 304 fall within a predetermined bandwidth (e.g., between 4.915 GHz and 5.825 GHz). In this example, the channels 302 and 304 are separated in frequency (e.g., 100 MHz between channels 302 and 304, etc.). Bandwidths for the non-contiguous channels 302 and 304 other than 40 MHz are possible and may depend on the particular implementation and/or communications protocol.

Referring to FIGS. 1, 2, and 3 together, an average of the center frequencies of the two non-contiguous channels 302 and 304 are utilized by the mixers 104a and 104b, via step 204, to down convert the non-contiguous channels 302 and 304. This down conversion provides a combined intermediate frequency (IF) channel 306 that has a center frequency that is the average of the difference between the center frequencies of the two channels 302 and 304. In one embodiment, in the digital domain, bandpass ADCs 108a and 108b may perform the down conversion of step 204.

Figure 4:
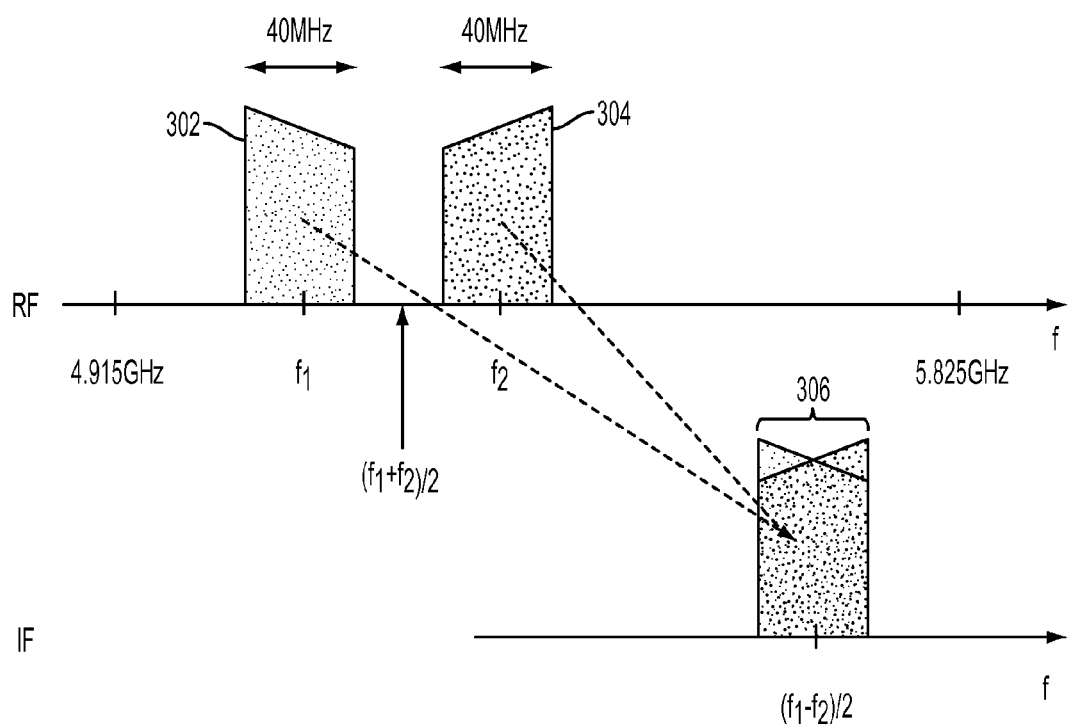
FIG. 4 illustrates the two non-contiguous channels of FIG. 3 being converted to a combined intermediate frequency (IF) channel.

FIG. 4 illustrates the two non-contiguous channels of FIG. 3 being converted to a combined intermediate frequency (IF) channel.

Next, via step 206, the combined IF channel 306 is down converted to a combined channel that is at a baseband (BB) frequency. In one embodiment, the combined channel 306 may be converted from the IF channel to a BB frequency through various means such as by utilizing bandpass (Σ-Δ) ADCs, or by utilizing IF analog down conversion (e.g., mixers). Next, the two channels 302 and 304 are recovered via step 208 from the combined channel at a baseband frequency utilizing an upper sideband and lower sideband recovery mechanism.

Figure 5:
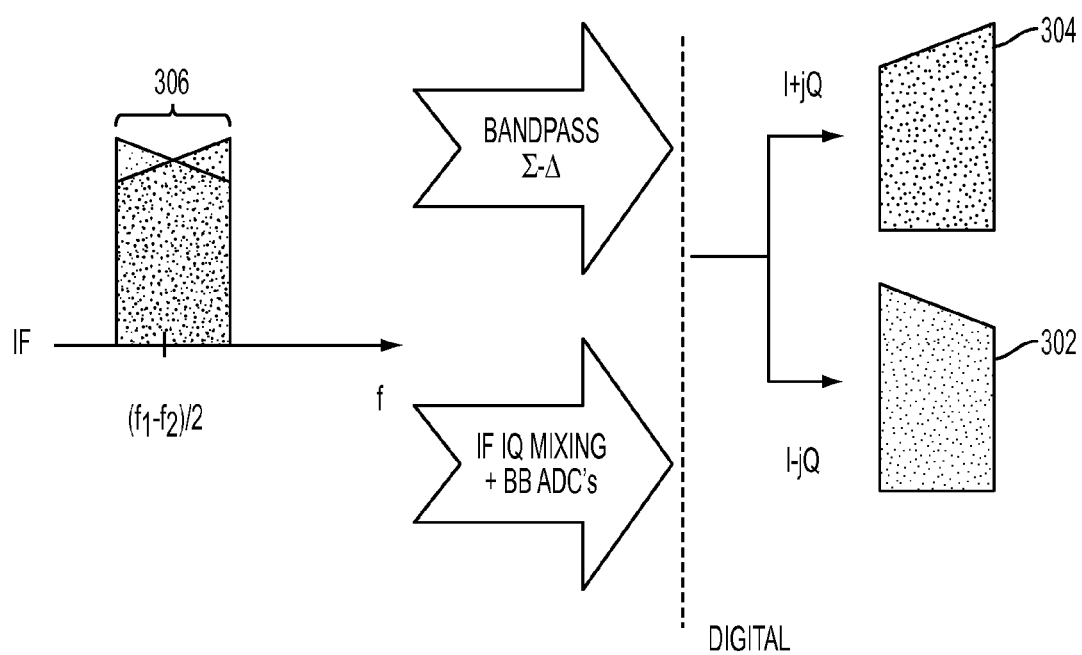
FIG. 5 illustrates the obtaining of the two non-contiguous channels from the combined IF channel.

FIG. 5 illustrates the obtaining of the two non-contiguous channels from the combined IF channel. In one embodiment, the digital signal processor 110 may reconstruct the two halves of the spectrum (e.g., the two channels 302 and 304) by an upper sideband (I+jQ) and lower sideband (I-jQ) recovery mechanisms in the digital domain.

In the embodiments described herein, image rejection does not need to be as good as conventional heterodyne receivers. Unlike conventional heterodyne receivers where the image can be much larger than the signal, in the embodiments disclosed herein, the power level of the signal and image are identical. As a result, an image rejection better than the required signal-to-noise ratio (SNR) (e.g., >30-40 dB) would be sufficient.

In one embodiment, filtering requirements for the adjacent and alternate channels may be the same between embodiments described herein and conventional two-receiver solutions.

Figure 6:
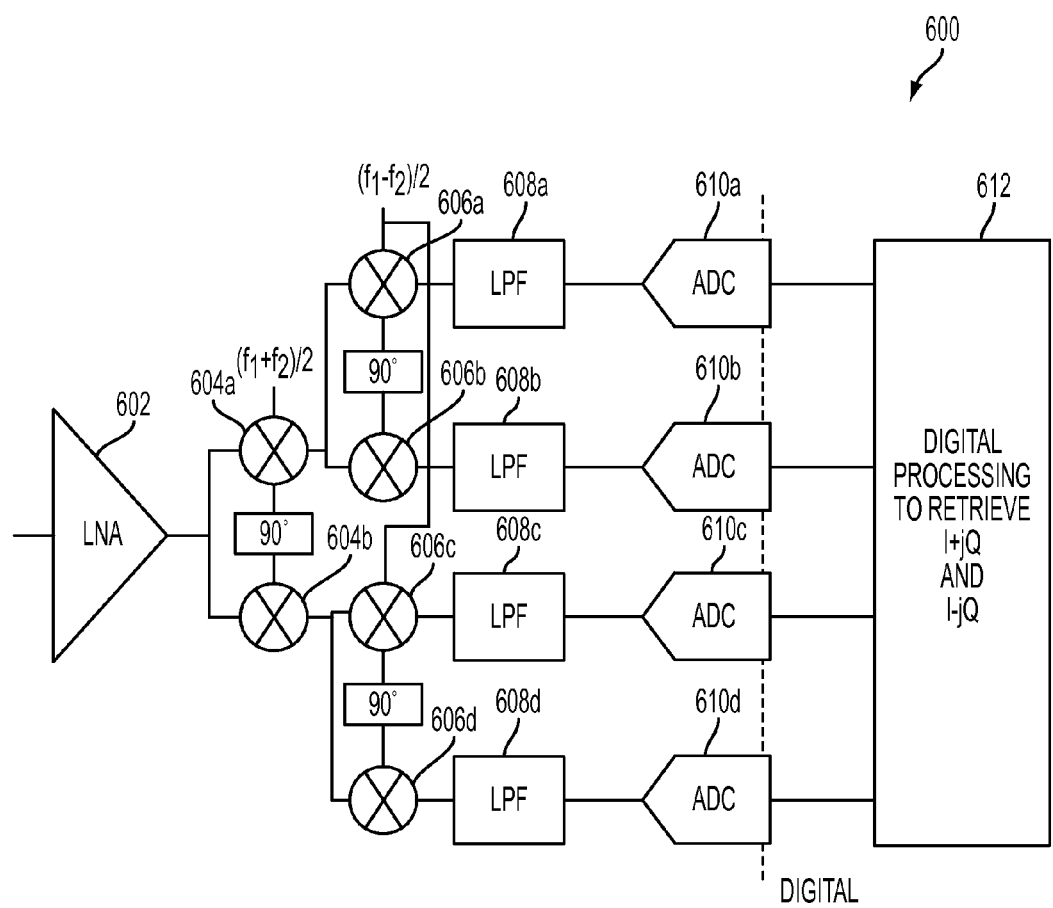
FIG. 6 is a block diagram of a second embodiment of a receiver circuit, in accordance with the present invention.

FIG. 6 is a block diagram of a second embodiment of a receiver circuit, in accordance with the present invention. The receiver circuit 600 includes a low-noise amplifier 602. The low-noise amplifier 602 is coupled to a first set of mixers 604a and 604b, which provide signals that are shifted by 90 degrees from each other. The mixer 604a is coupled to a second set of mixers 606a and 606b, which provide signals that are shifted by 90 degrees from each other. The mixer 604b is coupled to a second set of mixers 606c and 606d, which provide signals that are shifted by 90 degrees from each other. The mixer 606a is coupled to a low-pass filter 608a. The low-pass filter 608a is coupled to an ADC 610a. The ADC 610a is coupled to a digital signal processor 612. The mixer 606b is coupled to a low-pass filter 608b. The low-pass filter 608b is coupled to an ADC 610b. The ADC 610b is coupled to the digital signal processor 612. The mixer 606c is coupled to a low-pass filter 608c. The low-pass filter 608c is coupled to an ADC 610c. The ADC 610c is coupled to the digital signal processor 612. The mixer 606d is coupled to a low-pass filter 608d. The low-pass filter 608d is coupled to an ADC 610d. The ADC 610d is coupled to the digital signal processor 612.

In one embodiment, the first set of mixers 604a and 604b run at a first frequency $(f_1+f_2)/2$ to down convert the non-contiguous channels, where the first frequency is based on an average of the center frequencies of the channels. In one embodiment, the second set of mixers 606a, 606b, 606c, and 606d run at a second frequency $(f_1-f_2)/2$ to down convert the channels again to a combined IF channel that has a center frequency that is the average of the difference between the center frequencies of the non-continuous channels. In one embodiment, the second frequency $(f_1-f_2)/2$ is a lower frequency than the first frequency $(f_1+f_2)/2$.

Although this receiver circuit uses more power and requires extra area compared to the receiver circuit of FIG. 1, the filtering and the down conversion can be performed at the baseband (BB) frequency. Also, no in-phase/quadrature (I/Q) modulation is required at the first set of mixers 604a and 604b. In one embodiment, low-pass filters 608a, 608b, 608c, and 608d, and ADCs 610a, 610b, 610c, and 610d operate at 40 MHz bandwidth rather than at 80 MHz.

While example embodiments herein have been described in the context of receivers, embodiments may also be implemented in transmitters.

Embodiments disclosed herein provide numerous benefits. For example, embodiments enable the use of a single radio frequency receive path for processing signals across non-contiguous channels that are spaced in frequency. Embodiments of the present invention also eliminate a need for two separate radio receive paths, which saves area and power in an integrated circuit.

A method and system for processing signals across non-contiguous channels has been disclosed.

Embodiment described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-RAN).

Although the present invention has been described in accordance with the embodiments shown, one of ordinary skill in the art will readily recognize that there could be variations to the embodiments, and those variations would be within the spirit and scope of the present invention. Accordingly, many modifications may be made by one of ordinary skill in the art without departing from the spirit and scope of the appended claims.

What is claimed is:

1. A method for processing signals, the method comprising:
    receiving signals from at least two non-contiguous channels, wherein the at least two non-contiguous channels are within a predetermined bandwidth, and wherein each of the at least two non-contiguous channels has a center frequency;
    utilizing an average of the center frequencies of the at least two non-contiguous channels to down convert the at least two non-contiguous channels to a combined intermediate frequency (IF) channel that has a center frequency that is an average of a difference between the center frequencies of the at least two non-contiguous channels;
    down converting the combined IF channel to a combined channel at a baseband frequency; and
    recovering the at least two non-contiguous channels from the combined channel at a baseband frequency utilizing an upper sideband and lower sideband recovery mechanism.

2. The method of claim 1, wherein the at least two non-contiguous channels are of equal bandwidth.

3. The method of claim 1, wherein the receiving step comprises utilizing an amplifier to receive signals from the at least two non-contiguous channels.

4. The method of claim 1, wherein the utilizing step comprises utilizing a plurality of mixers to down convert the at least two non-contiguous channels to the combined IF channel.

5. The method of claim 4, wherein the mixers provide signals that are shifted by 90 degrees from each other.

6. The method of claim 1, wherein the utilizing step comprises utilizing at least two sets of mixers to down convert the at least two non-contiguous channels to a combined IF channel.

7. The method of claim 6, wherein the utilizing step comprises utilizing a plurality of bandpass filters to down convert the at least two non-contiguous channels to a combined IF channel.

8. The method of claim 1, wherein the down converting step comprises utilizing at least one analog-to-digital converter to down convert the combined IF channel to the combined channel at the baseband frequency.

9. The method of claim 1, wherein the recovering step utilizes a digital signal processor to recover the least two non-contiguous channels from the combined channel at the baseband frequency utilizing an upper sideband and lower sideband recovery mechanism.

10. A system comprising:
    an amplifier for receiving signals from at least two non-contiguous channels, wherein the at least two non-contiguous channels are within a predetermined bandwidth, and wherein each of the at least two non-contiguous channels has a center frequency;
    at least two down converters coupled to the amplifier, wherein the at least two down converters:
    utilize an average of the center frequencies of the at least two non-contiguous channels to down convert the at least two non-contiguous channels to a combined intermediate frequency (IF) channel that has a center frequency that is an average of a difference between the center frequencies of the at least two non-contiguous channels; and
    down convert the combined IF channel to a combined channel at a baseband frequency; and
    a signal processor coupled to the at least two down converters, wherein the signal processor recovers the at least two non-contiguous channels from the combined channel at a baseband frequency utilizing an upper sideband and lower sideband recovery mechanism.

11. The system of claim 10, wherein the at least two non-contiguous channels are of equal bandwidth.

12. The system of claim 10, wherein one channel of the at least two non-contiguous channels is an image of the other channel of the at least two non-contiguous channels.

13. The system of claim 10, wherein the down converters comprise a plurality of mixers.

14. The system of claim 10, wherein the down converters comprise a plurality of bandpass filters.

15. A receiver comprising:
    an amplifier for receiving signals from at least two non-contiguous channels, wherein the at least two non-contiguous channels are within a predetermined bandwidth, and wherein each of the at least two non-contiguous channels has a center frequency;
    at least two sets of mixers coupled to the amplifier, wherein the at least two sets of mixers utilize an average of the center frequencies of the at least two non-contiguous channels to down convert the at least two non-contiguous channels to a combined intermediate frequency (IF) channel that has a center frequency that is an average of a difference between the center frequencies of the at least two non-contiguous channels;

an analog-to-digital converter (ADC) coupled to at least two sets of mixers, wherein the ADC down converts the combined IF channel to a combined channel at a baseband frequency; and a signal processor coupled to the ADC, wherein the signal processor recovers the at least two non-contiguous channels from the combined channel at a baseband frequency utilizing an upper sideband and lower sideband recovery mechanism.

16. The receiver of claim 15, wherein the at least two channels are of equal bandwidth.

17. The receiver of claim 15, wherein one channel of the at least two non-contiguous channels is an image of the other channel of the at least two non-contiguous channels.

18. The receiver of claim 15, wherein one set of the at least two sets of mixers down converts the at least two non-contiguous channels utilizing an average of the center frequencies of the at least two non-contiguous channels.

19. The receiver of claim 15, wherein one set of the at least two sets of mixers down converts the at least two non-contiguous channels to the combined IF channel having a center frequency that is the average of the difference between the center frequencies of the at least two non-contiguous channels.

20. The receiver of claim 15, further comprising at least two low-pass filters.

* * * * *